(12) United States Patent
Johnson

(10) Patent No.: US 6,236,691 B1
(45) Date of Patent: May 22, 2001

(54) SIGNAL DEMODULATION METHOD AND APPARATUS

(75) Inventor: Neldon P. Johnson, American Fork, UT (US)

(73) Assignee: International Automated Systems, Inc., American Fork, UT (US)

(*) Notice: Subject to any disclaimer, the term of this patent is extended or adjusted under 35 U.S.C. 154(b) by 0 days.

(21) Appl. No.: 09/268,707

(22) Filed: Mar. 16, 1999

(51) Int. Cl.⁷ .............................. H03D 1/00; H04L 27/06
(52) U.S. Cl. ............................................. 375/340; 375/260
(58) Field of Search ................................. 375/340, 360, 375/316, 295, 350, 259, 268, 320, 285, 346; 329/347, 349, 363

(56) References Cited

U.S. PATENT DOCUMENTS

| | | | |
|---|---|---|---|
| 3,805,191 | 4/1974 | Kuwai | 332/9 |
| 3,890,620 | 6/1975 | Toman | 343/108 |
| 4,001,728 | 1/1977 | Schneider | 332/1 |
| 4,103,238 | 7/1978 | Deming | 325/141 |
| 4,347,616 | 8/1982 | Murakami | 375/20 |
| 4,387,455 | 6/1983 | Schwartz | 370/11 |
| 4,480,485 | * 11/1984 | Yazuka et al. | 375/259 |
| 4,584,692 | 4/1986 | Yazuka | 375/38 |
| 4,766,589 | 8/1988 | Fisher | 370/98 |
| 5,220,557 | 6/1993 | Kelley | 455/103 |
| 5,274,672 | 12/1993 | Weiss | 375/305 |
| 5,364,536 | 11/1994 | Tsujimoto | 375/363 |
| 5,367,536 | * 11/1994 | Tsujimoto | 375/269 |
| 5,369,669 | 11/1994 | Tombal et al. | 370/110.4 |
| 5,390,185 | 2/1995 | Hooijmans et al. | 370/98 |
| 5,517,528 | * 5/1996 | Johnson | 375/259 |
| 5,519,735 | 5/1996 | Rice | 375/347 |
| 5,640,422 | * 6/1997 | Johnson | 375/259 |
| 5,687,529 | * 11/1997 | Johnson | 375/259 |
| 6,088,403 | * 7/2000 | Johnson | 375/340 |
| 6,122,323 | * 9/2000 | Johnson | 375/259 |
| 6,137,831 | * 10/2000 | Johnson | 375/229 |

* cited by examiner

*Primary Examiner*—Tesfaldet Bocure
(74) *Attorney, Agent, or Firm*—J. David Nelson

(57) ABSTRACT

A method and apparatus for separating multiple frequency information signals. This invention provides a method and apparatus for separating a communications signal, which is comprised of multiple component information waves of distinct frequencies, into its component waves for demodulation. The extraction of the component information waves is accomplished by determining the mid-cycle zero crossing points of the component information waves by reference to a reference wave, determining the amplitude of the combined wave at these zero crossing points and generating amplitude equations for each of these zero crossing points. These amplitude equations are solved to determine the amplitude coefficients of the component information waves, thereby extracting the transmitted information.

30 Claims, 2 Drawing Sheets

SIGNAL DEMODULATION METHOD AND APPARATUS

PRIOR RELATED APPLICATIONS

This application is related to two prior filed and currently pending U.S. patent applications, Ser. No. 08/879,755 filed on Jun. 20, 1997, now issued as U.S. Pat. No. 6,137,831 on Oct. 24, 2000 and Ser. No. 09/043,478 filed on Mar. 23, 1998, now issued as U.S. Pat. No. 6,122,323 on Sep. 12, 2000. These applications are hereinafter referred to as the "prior related applications".

FIELD OF THE INVENTION

This invention is the field of filters for electromagnetic signals and in particular the field of filter systems for separating the components of multiple frequency signals.

BACKGROUND OF THE INVENTION

The conventional method for separating out an information signal of a specific frequency from signals of other frequencies, which together with the specific frequency comprise a combined signal, and from noise, is a filter comprised of inductor and capacitor circuits. Such filters interfere with and alter the wave and, therefore, fail to reproduce the wave in the pure form in which it was transmitted. The bandwidth of the retrieved wave is substantially larger than the bandwidth of the wave as transmitted. It should be noted, however, that the increase in the bandwidth is not a function of the propagation of the wave. It is a function of the filtering process.

Another problem with conventional filters is that they require multiple cycles of the input signal in order to ramp up. Until the ramping up is complete, the filtering will be ineffective. This substantially limits the amount of data that can be transmitted by multiple frequency signals and extracted by conventional filters. A filtering method is needed which will allow a single cycle to be filtered and data to be accurately extracted from each cycle.

The inventor herein has had three prior patents issued which disclose methods and apparatuses for digital information transfer. They are U.S. Pat. Nos. 5,517,528, 5,640,422, and 5,689,529 to Johnson, and are hereinafter referred to as the "prior related patents". Also, a prior application, U.S. application Ser. No. 08/879,755, has been filed by the inventor herein which discloses certain methods and apparatuses for filtering electromagnetic signals. The present application discloses an additional method and an additional apparatus for filtering electromagnetic signals.

Continuous combined information waves which are simultaneously generated at multiple frequencies, combined and transmitted as a single information signal are disclosed in the prior related applications and patents. Advanced filter systems which allow the utilization of the capabilities of the inventions disclosed in the prior related applications and patents are also disclosed in the prior related applications and patents. However, a filter method and apparatus is needed which will provide for minimizing the complexity of the signal separation process, minimizing the bandwidth of the extracted multiple frequency components, and enhancing the accuracy of the extracted data.

The limitations of conventional signal extraction methods also impose substantial limitations on digital information storage technology. Current digital technology allows only one bit per cycle to be transferred from a read/write head to a magnetic storage device such as a hard drive, a magnetic disc, or an external magnetic drive. These current storage systems operate using analog functions. In addition, as data is transferred, the spacing between the storage medium and the read/write head changes, distorting or degrading the signal amplitude. When the distance between the head and the storage medium changes, the energy transfer rate is inversely proportional to the square of the distance. Therefore, any deviation of the read/write head changes the amplitude of the waves. For this reason digital recording procedures can measure only amplitude change. No information is derived from actual amplitudes.

One objective of the present invention is to provide an improved and simplified method and apparatus for filtering and separating combined multiple frequency signals.

Another objective of the present invention is to provide for separation of individual frequency components of multiple frequency signals while minimizing interference and minimizing the bandwidth of each of the extracted components, thus further enhancing the accuracy of the data transmitted by each of the extracted wave components.

A still further objective of the present invention is to provide a method and apparatus for separating multiple frequency combined signals while minimizing bandwidth distortion.

A still further objective of the present invention is to provide a method and apparatus for filtering simultaneous multiple frequency signals of distinct frequencies which is simpler, more reliable, and less costly than conventional methods.

A still further objective of the present invention is to provide a filter method and apparatus which will increase the storage capacity of magnetic digital storage devices and will enhance the accuracy of data transfer between a read/write head and a magnetic storage device.

A still further objective of the present invention is to provide an effective filter method and apparatus which is adapted for use with the information transfer receiver apparatuses disclosed in the prior related applications.

SUMMARY OF INVENTION

The present invention provides an improved method and apparatus for filtering and separating a received multiple frequency combined signal into its various frequency components. It may be used in conjunction with the digital information transfer inventions disclosed in the prior related applications and patents.

The method of the present invention comprises a method of extracting information from an electromagnetic signal which is comprised of two or more waves of distinct frequencies. Under certain preferred embodiments the combined information wave is comprised of a reference wave with a known wave form, amplitude, frequency and phase and one or more component information waves with known wave forms and frequencies and a known phase relationship to the reference wave. The frequencies of each of the component information waves is distinct from the frequency of each of the other component information waves and the reference wave. For certain preferred embodiments the frequency of the reference wave is sufficiently less than the frequencies of the component information waves so that it can be separated from the rest of the combined information wave by a typical narrow bandpass filter. The ratio of the amplitude of each cycle of each respective component information wave to the amplitude of the reference wave is a function of the digital data being transmitted by that component information wave.

Rather than consisting of an arrangement of narrow band pass filters and other necessary components as in a conventional filter system or consisting of the special filters disclosed in the prior related applications and patents, certain preferred embodiments of the method of the present invention simply requires one or more computer circuits which perform a mathematical analysis on the received combined signal.

The first step in extracting the information from the combined information wave as received by the receiving apparatus is to store the combined information wave for processing. The combined information wave is then passed through a narrow bandpass filter with frequency selected to match the frequency of the reference wave, thereby extracting the reference wave from the combined information wave. Next, the zero crossing points of the reference wave are determined by locating points on the wave which are half way between the positive apex and the negative apex of the wave. Once the zero crossing points of the reference wave have been determined, since the frequencies and the phase relationship of the component information waves with respect to the reference wave are known the zero crossing points of each of the component information waves can be determined.

Amplitude equations are then generated for each of the component information wave zero crossing points. Each of these equations is in the form of the sum of the unknown amplitude of each non-zero component information wave as multiplied by its known phase factor at that point which together equal the observed amplitude at the component information wave zero crossing point in question. This process results in the generation of linear amplitude equations with the number of equations and number of unknowns being equal to the number of component information waves. Next, these equations are solved for the unknown amplitudes thereby extracting the transmitted digital information corresponding to each component information wave.

The receiving apparatus of certain preferred embodiments of the present invention includes a combined wave analog to digital converter to digitize the combined information wave as it is received and a digital storage medium for storing the digitized wave. A narrow bandpass filter extracts the reference wave from the combined information wave and then the reference wave is also digitized by a reference wave digitizer and passed to a reference zero crossing computer where the zero crossing points are located on the wave at points where the wave is half way between the positive wave apex and the negative wave apex. The residual combined information wave which is the combined information wave with the reference wave extracted passes to the residual wave digitizer and then is stored in the residual wave storage device. The digitized residual wave is then passed along with the reference wave zero crossing point information to the amplitude equation computer which generates and solves the amplitude equations thereby determining the amplitudes of the component information waves.

An embodiment of a transmission apparatus which can be used to generate and transmit the combined information wave for which the present invention was designed to extract information, would include a reference wave generator, a digital to analog generator for converting to analog the digital signals which are to be transmitted by each component information wave, a gain control device for adjusting the amplitude of the combined information wave and a transmitter for transmitting the amplitude adjusted combined information wave. Embodiments of transmission methods and apparatuses for generating and transmitting the combined information waves from which the present invention is designed to extract information are disclosed in the prior related inventions and applications.

A reference wave can be a discontinuous and periodically repeated wave, a discontinuous wave which is repeated with the same frequency as the component information waves, or a continuous wave. In any event, for most preferred embodiments it would have a pre-set amplitude.

For certain preferred embodiments of the present invention, the ratio of the amplitude of a component information wave to the amplitude of the reference wave is determined by the magnitude of the digital information carried by that component information wave. However, the amplitude of the component information wave may merely be a function of the digital data transmitted. The amplitude of the component information waves can be adjusted at the receiver by comparing the amplitude of the reference wave as received to the known amplitude of the reference wave as transmitted.

The filtration method of the present invention does not interfere with the combined wave or the component waves and the information component can be removed with little distortion and with a much narrower bandwidth as compared with conventional filters.

Preferred embodiments of the present invention involve a mathematical analysis and the use of one or more computer circuits. For preferred embodiments, each component information wave has a known wave form and frequency. Also, under preferred embodiments, the relative phase or positioning of each component information wave with regard the reference wave is also known.

Certain preferred embodiments utilize additional steps to enhance the extraction of the component information waves for certain applications. For these embodiments, the amplitude of the combined information wave is adjusted prior to transmission to a selected amplitude so that all cycles of the combined wave have the same pre-set amplitude. Since the amplitudes of the reference and information waves are adjusted proportionally when the combined wave is adjusted, the amplitude adjustment does not affect the accuracy of the information transmitted.

In the same manner the amplitudes of all of the combined waves in a wave stream, can be adjusted so that they are all the same amplitude. This step allows the waves to be filtered at the receiver through conventional filters or the special filters disclosed in the prior related applications and patents. Because all the waves in a particular wave stream are of the same amplitude they can pass through a conventional filter. Also, because each half cycle is the same amplitude the zero crossing of the reference wave can be found by halving the amplitude. Also, a single cycle of the resultant wave can be stored and can be repeatedly sent through a filter. To the filter this will appear as a continuous wave and will pass through, while noise will be filtered out. The waves can then be separated using the methods disclosed.

The step of making all of the combined waves the same amplitude is very useful in certain applications, especially those applications where passing the signal through conventional filters is required. This is the case for telephone line communications. It also has utility in wireless communication where communication signals such as the time slotted multiple frequency signals disclosed in the prior related applications can first be separated from other communication signals channels using regular filter techniques. Then the component information waves can be extracted using the methods disclosed for the present invention. This process will provide a cleaner wave for component wave extraction by the methods disclosed.

A benefit to this type of modulation and these embodiments of the present invention is that whatever affects the combined wave affects the component information waves and reference wave proportionally. Therefore, the effects of noise and interference are minimized.

DETAILED DESCRIPTION OF PREFERRED EMBODIMENTS

Figure 1:
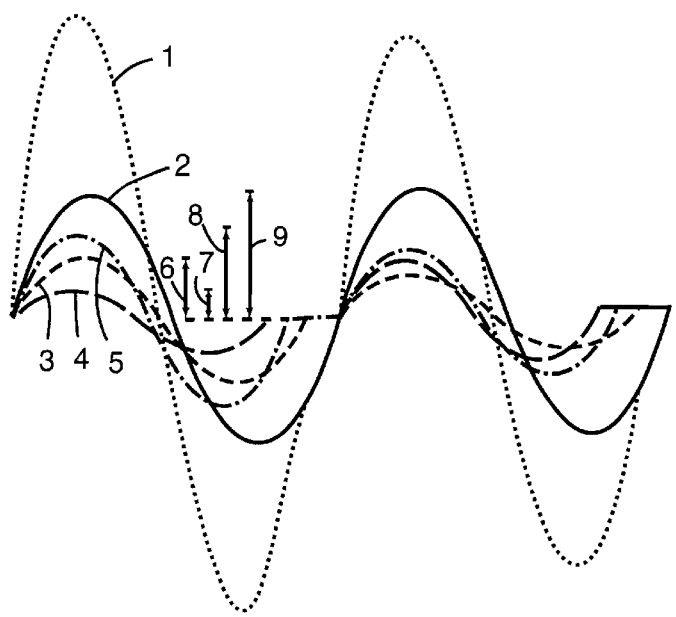
FIG. 1 is an illustration of a combined information wave comprised of the reference wave and three component information wave.

Referring first to FIG. 1, this figure illustrates a combined information wave 1 which is comprised of a reference wave 2 and three component information waves, a first component information wave 3, a second component information wave 4, and a third component information wave 5. The combined information wave can be comprised of a reference wave and any number of component information waves, subject only to the processing capability of the receiving apparatus. The amplitude of each cycle of each component information wave is a function of the digital information being transmitted by that component information wave. Under preferred embodiments the ratio of the amplitudes of each of the component information waves, the first component amplitude 6, the second component amplitude 7, and the third component amplitude 8, to the amplitude of the reference wave 9 is used to transmit the information. This allows amplitude adjustment of the combined information wave to facilitate transmission or to facilitate filtering or further processing of the signal at receiver. This also preserves the integrity of the data transmitted regardless of noise, attenuation or other interference with the signal, whether the signal was transmitted by wireless signal or other common media such as telephone lines or coaxial cable.

Figure 2:
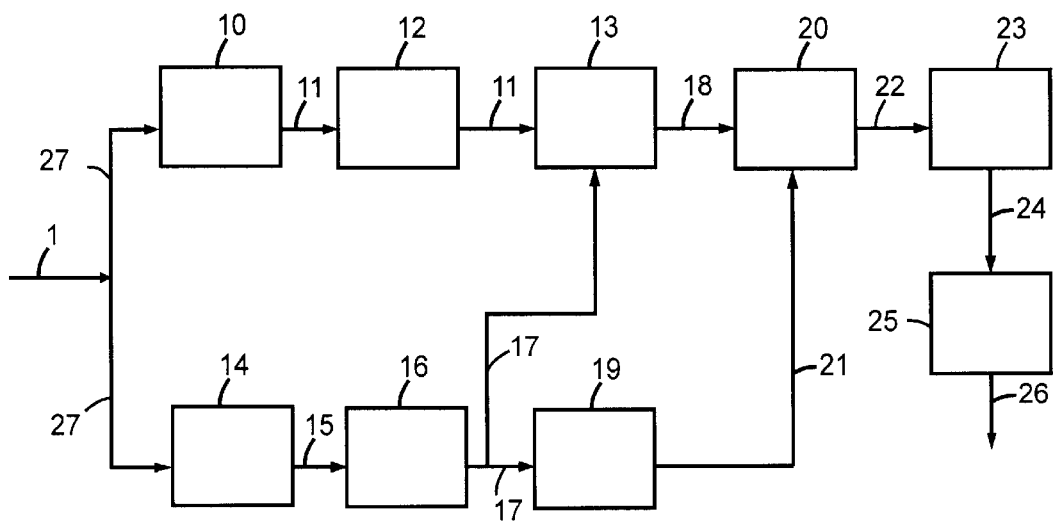
FIG. 2 is a schematic diagram of a preferred embodiment of a demodulation apparatus of the present invention.

The process of extracting the digital information carried by each component information wave begins, under certain preferred embodiments by splitting the combined information wave, and passing the split combined information wave 27 through a combined wave analog to digital converter 10, as shown in FIG. 2, thereby producing a digitized combined wave 11 and storing the wave for further processing in the combined wave storage 12.

The split combined information wave is also passed through a narrow band pass filter, the reference wave filter 14, thereby extracting the reference wave from the combined information wave. The extracted reference wave 15 is then directed through a reference wave analog to digital converter 16, thereby producing a digitized reference wave 17. A digitized residual combined wave 18 is generated by a wave subtractor 13 which subtracts the digitized reference wave from the digitized combined wave.

Figure 3:
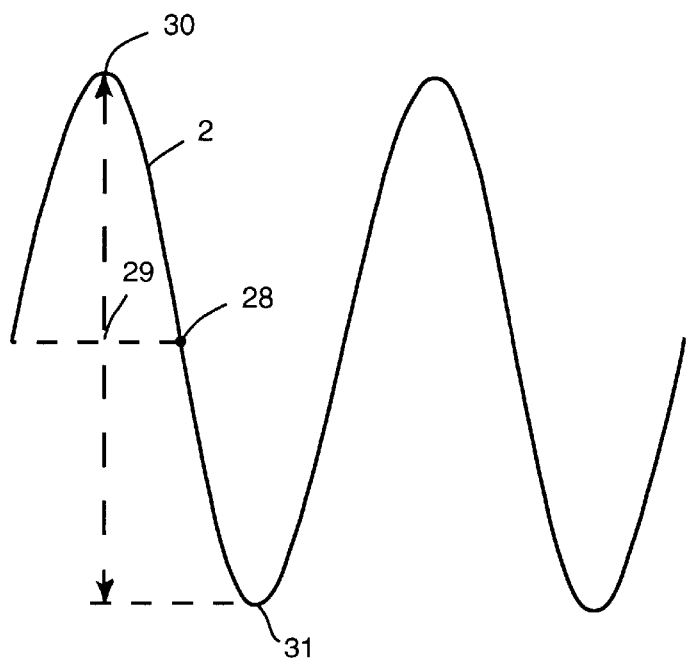
FIG. 3 illustrates an extracted reference wave with zero crossing point determination.
Figure 4:
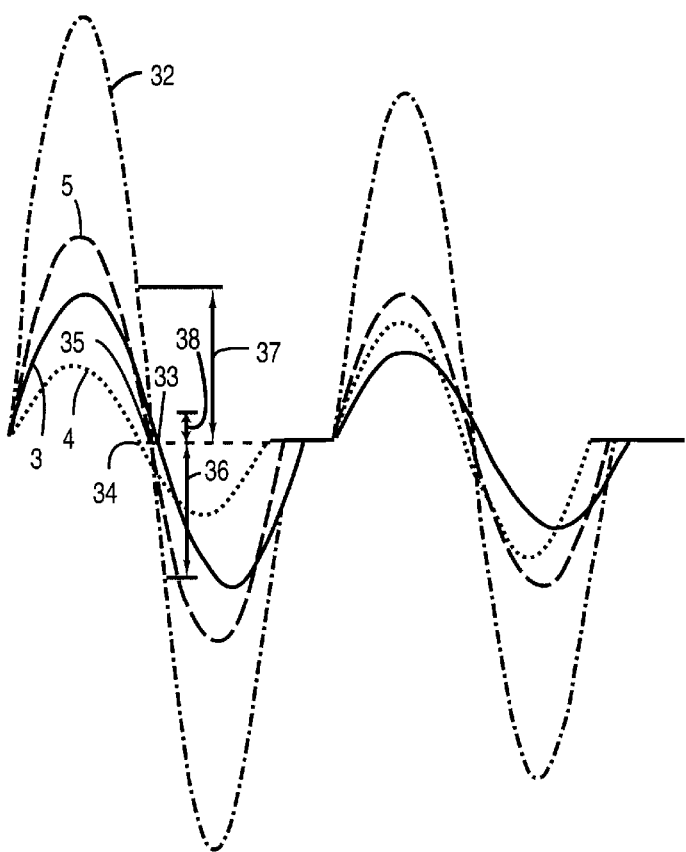
FIG. 4 illustrates a residual combined information wave with component information wave zero crossing point location and amplitude determination.

The next step process is the determination of the mid-cycle zero crossing point 28 of the reference wave as shown in FIG. 3. This is performed by determining the point on the wave which lies on the half way line 29 which is equidistant from the positive apex 30 and the negative apex 31 of the reference wave. This is accomplished by the reference wave zero crossing determinator 19 shown in FIG. 2. Once the reference wave zero crossing point has been determined, the zero crossing points of each of the component information waves as shown in FIG. 4 can be determined by the component wave zero crossing determinator 20 as shown in FIG. 2 through the use of the reference wave zero crossing data 21 and the digitized residual combined wave. Referring to FIG. 4 again, the first component zero crossing point 33 of the first component information wave 3, the second component zero crossing point 34 of the second component information wave 4, and the third component zero crossing point 35 of the third component information wave 5, can be determined by the component wave zero crossing determinator because the phase relationship between each of the component information waves and the reference wave is known. The first component zero crossing amplitude 36, the second component zero crossing amplitude 37, and the third component zero crossing amplitude 38 are determined by the component zero crossing amplitude determinator 23 shown in FIG. 2 from the residual combined information wave 32 shown in FIG. 4 through the use of the component wave zero crossing data 22. The component zero crossing amplitude data 24 is used to generate an amplitude equation for each of the zero crossing points.

For the example illustrated in FIG. 1, which is a combined information wave comprised of a sinusoidal reference wave and sinusoidal first combined component information wave, second component information wave and third component information wave, the waves each have the general form of $a*\sin(\overline{\omega}t+\phi)$ with a being the amplitude coefficient (maximum amplitude) of the wave, $\overline{\omega}$ being the frequency, and $\phi$ being the phase displacement. Since the phase relationship between the reference wave and each of the component information waves is known, amplitude equations are generated and solved by the amplitude equation solver 25 from the component zero crossing amplitude data 24 as shown in FIG. 2. The only unknown for each component information wave is the amplitude coefficient for a given cycle. The amplitude equations which are generated for the example illustrated in FIG. 1 and FIG. 4 are as follows:

$$a_1c_1+a_2c_2=A_1.$$

$$a_2c_3+a_3c_4=A_2$$

$$a_1c_5+a_3c_6=A_3$$

For the amplitude equations illustrated above, the only unknowns are the amplitude coefficients of the component information waves, namely $a_1$, $a_2$ and $a_3$. Those three unknown component information amplitude coefficients 26 can be determined from the solution of these three linear equations by the amplitude equation solver 25 as shown in FIG. 2.

The present invention may be utilized with component information waves which are distributed in the cycle or keyed to the cycle of the reference wave in any selected manner. The component information waves for the embodiment shown in FIG. 1 and 4 are sinusoidal waves. However, the present invention can be utilized with component information waves of any selected wave form.

For embodiments of the present invention used in conjunction with the inventions disclosed in the prior related applications, the process is repeated for combined information waves in successive cycles of the reference wave. In this way, multiple channels of combined information waves can each be successfully and accurately separated into its component information waves for demodulation.

The speed at which the extraction process can be accomplished for the combined information wave received in each reference wave cycle will be dependent on the embodiment of hardware and software utilized.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Method for extracting component information waves from a combined information wave, said combined information wave comprising two or more component information waves of known and distinct frequencies and known wave forms and phases, said method comprising:
    a) a step of determining an amplitude of the combined information wave at the mid-cycle zero crossing point of each of the component information waves;
    b) a step of generating amplitude equations, one of the amplitude equations corresponding to each of the mid-cycle zero crossing points, with the sum of the unknown amplitude coefficients of each of the non-zero component information waves, as adjusted by the phase factor for the corresponding component information wave, being equal to the measured amplitude of the combined information wave at the mid-cycle zero crossing point; and
    c) a step of solving the amplitude equations to determine the amplitude coefficients of each of the component information waves.

2. Method as recited in claim 1 wherein the combined information wave further comprises a reference wave of known amplitude, frequency and phase, and wherein the component information waves are synchronized by reference to the reference wave, and the method further comprises a step of passing the combined information wave through a narrow bandwidth filter thereby extracting the reference wave from the combined information wave, a step of determining one or more zero crossing points of the reference wave, and a step of determining the mid-cycle zero crossing points of the component information waves by reference to the reference wave.

3. Method as recited in claim 1 wherein the combined information wave is amplitude adjusted to a selected amplitude.

4. Method as recited in claim 2 wherein the combined information wave is amplitude adjusted to a selected amplitude.

5. Method as recited in claim 2 wherein the ratio of the amplitude of each component information wave to the amplitude of the reference wave, is a function of the information transmitted by the component information wave.

6. Method as recited in claim 4 wherein the ratio of the amplitude of each component information wave to the amplitude of the reference wave, is a function of the information transmitted by the component information wave.

7. Method for extracting component information waves from a combined information wave, said combined information wave comprising a reference wave and one or more component information waves, the reference wave and each of the component information waves having known wave forms, known and distinct frequencies, and known phases, the reference wave having a known amplitude, and the component information waves being synchronized by reference to the reference wave, said method comprising:
    a) a step of passing the combined information wave through a narrow bandwidth filter thereby extracting the reference wave from the combined information wave;
    b) a step of determining one or more zero crossing points of the reference wave;
    c) a step of determining mid-cycle zero crossing points of each of the component information waves by reference to the reference wave;
    d) a step of determining an amplitude of the combined information wave at the mid-cycle zero crossing point of each of the component information waves;
    e) a step of generating amplitude equations, one of the amplitude equations corresponding to each of the mid-cycle zero crossing points of the component information waves with the sum of the unknown amplitude coefficients of each of the non-zero component information waves, as adjusted by the phase factor for the corresponding component information wave, being equal to the measured amplitude of the combined information wave at the mid-cycle zero crossing point; and
    f) a step of solving the amplitude equations to determine the amplitude coefficients of each of the component information waves.

8. Method as recited in claim 7 wherein the combined information wave is amplitude adjusted to a selected amplitude.

9. Method as recited in claim 8 wherein the combined information wave is amplitude adjusted to a selected amplitude.

10. Method as recited in claim 8 wherein the ratio of the amplitude of each component information wave to the amplitude of the reference wave, is a function of the information transmitted by the component information wave.

11. Method as recited in claim 10 wherein the ratio of the amplitude of each component information wave to the amplitude of the reference wave, is a function of the information transmitted by the component information wave.

12. Method for digital information transfer comprising:
    a) a step of generating a reference wave of a selected wave form, amplitude, frequency and phase;
    b) a step of generating one or more component information waves of a selected wave form, the frequency of each component information wave being distinct from each of the other component information waves and from the reference wave, and the amplitude of successive cycles of each component information wave being a function of successive magnitudes of a corresponding source digital signal;
    c) a step of combining the reference wave and the component information waves to form a combined information wave, the phase relationship between the reference wave and the component information waves being selected to provide for synchronization of the component information waves with the reference wave;
    d) a step of transmitting the combined information wave;
    e) a step of receiving the combined information wave;
    f) a step of passing the combined information wave through a narrow bandwidth filter thereby extracting the reference wave from the combined information wave;

g) a step of determining one or more zero crossing points of the reference wave;

h) a step of determining mid-cycle zero crossing points of each of the component information waves by reference to the reference wave;

i) a step of determining an amplitude of the combined information wave at the mid-cycle zero crossing point of each of the component information waves;

j) a step of generating amplitude equations, one of the amplitude equations corresponding to each of the mid-cycle zero crossing points with the sum of the unknown amplitude coefficients of each of the non-zero component information waves, as adjusted by the phase factor for the corresponding component information wave, being equal to the measured amplitude of the combined information wave at the mid-cycle zero crossing point; and k) a step of solving the amplitude equations to determine the amplitude coefficients of each of the component information waves.

13. Method as recited in claim 12 wherein the amplitude of the combined information wave is adjusted to a selected amplitude prior to transmission.

14. Method as recited in claim 12 wherein the ratio of the amplitude of each cycle of each component information wave to the amplitude of the reference wave, is a function of the magnitude of the corresponding source digital signal.

15. Method as recited in claim 13 wherein the ratio of the amplitude of each cycle of each component information wave to the amplitude of the reference wave, is a function of the magnitude of the corresponding source digital signal.

16. Apparatus for extracting component information waves from a combined information wave, said combined information wave comprising two or more component information waves of known and distinct frequencies and known wave forms and phases, said apparatus comprising:

a) means for determining an amplitude of the combined information wave at the mid-cycle zero crossing point of each of the component information waves;

b) means for generating amplitude equations, one of the amplitude equations corresponding to each of the mid-cycle zero crossing points with the sum of the unknown amplitude coefficients of each of the non-zero component information waves, as adjusted by the phase factor for the corresponding component information wave, being equal to the measured amplitude of the combined information wave at the mid-cycle zero crossing point; and c) means for solving the amplitude equations to determine the amplitude coefficients of each of the component information waves.

17. Apparatus as recited in claim 16 wherein the combined information wave further comprises a reference wave of known amplitude, frequency and phase, and wherein the component information waves are synchronized by reference with the reference wave, and the apparatus further comprises means for passing the combined information wave through a narrow bandwidth filter thereby extracting the reference wave from the combined information wave, means for determining one or more zero crossing points of the reference wave, and means for determining the zero crossing points of the component information waves by reference to the reference wave.

18. Apparatus as recited in claim 16 wherein the amplitude of the combined information wave is adjusted to a selected amplitude.

19. Apparatus as recited in claim 17 wherein the amplitude of the combined information wave is adjusted to a selected amplitude.

20. Apparatus as recited in claim 17 wherein the ratio of the amplitude of each component information wave to the amplitude of the reference wave, is a function of the information transmitted by the component information wave.

21. Apparatus as recited in claim 18 wherein the ratio of the amplitude of each component information wave to the amplitude of the reference wave, is a function of the information transmitted by the component information wave.

22. Apparatus for extracting component information waves from a combined information wave, said combined information wave comprising a reference wave and one or more component information waves, the reference wave and each of the component information waves having known wave forms, known and distinct frequencies, and known phases, the reference wave having a known amplitude, and the component information waves being synchronized by reference with the reference wave, said apparatus comprising:

a) means for passing the combined information wave through a narrow bandwidth filter thereby extracting the reference wave from the combined information wave;

b) means for determining one or more zero crossing points of the reference wave;

c) means for determining mid-cycle zero crossing points of each of the component information waves by reference to the reference wave;

d) means for determining an amplitude of the combined information wave at the mid-cycle zero crossing point of each of the component information waves;

e) means for generating amplitude equations, one of the amplitude equations corresponding to each of the mid-cycle zero crossing points with the sum of the unknown amplitude coefficients of each of the non-zero component information waves, as adjusted by the phase factor for the corresponding component information wave, being equal to the measured amplitude of the combined information wave at the mid-cycle zero crossing point; and f) means for solving the amplitude equations to determine the amplitude coefficients of each of the component information waves.

23. Apparatus as recited in claim 22 further comprising means for adjusting the amplitude of the combined information wave to a selected amplitude.

24. Apparatus as recited in claim 23 further comprising means for adjusting the amplitude of the combined information wave to a selected amplitude.

25. Apparatus as recited in claim 23 further comprising means for adjusting the amplitude of each component information wave such that the ratio of the amplitude of the component information wave to the amplitude of the reference wave, is a function of the information transmitted by the component information wave.

26. Apparatus as recited in claim 25 further comprising means for adjusting the amplitude of each component information wave such that the ratio of the amplitude of the component information wave to the amplitude of the reference wave, is a function of the information transmitted by the component information wave.

27. Apparatus for digital information transfer comprising:
a) means for generating a reference wave of a selected wave form, amplitude, frequency and phase;
b) means for generating one or more component information waves of a selected wave form, the frequency of each component information wave being distinct from each of the other component information waves and from the reference wave, and the amplitude of successive cycles of each component information wave being a function of successive magnitudes of a corresponding source digital signal;
c) means for combining the reference wave and the component information waves to form a combined information wave, the phase relationship between the reference wave and the component information waves being selected to provide for synchronization of the component information waves with the reference wave;
d) means for transmitting the combined information wave;
e) means for receiving the combined information wave;
f) means for passing the combined information wave through a narrow bandwidth filter thereby extracting the reference wave from the combined information wave;
g) means for determining one or more zero crossing points of the reference wave;
h) means for determining mid-cycle zero crossing points of each of the component information waves by reference to the reference wave;
i) means for determining an amplitude of the combined information wave at the mid-cycle zero crossing point of each of the component information waves;
j) means for generating amplitude equations, one of the amplitude equations corresponding to each of the mid-cycle zero crossing points with the sum of the unknown amplitude coefficients of each of the non-zero component information waves, as adjusted by the phase factor for the corresponding component information wave, being equal to the measured amplitude of the combined information wave at the mid-cycle zero crossing point; and
k) means for solving the amplitude equations to determine the amplitude coefficients of each of the component information waves.

28. Apparatus as recited in claim 27 wherein the amplitude of the combined information wave is adjusted to a selected amplitude prior to transmission.

29. Apparatus as recited in claim 27 further comprising means for adjusting the amplitude of each cycle of each component information wave such that the ratio of the amplitude of each cycle of each component information wave to the amplitude of the reference wave is a function of the magnitude of the corresponding source digital signal.

30. Apparatus as recited in claim 28 further comprising means for adjusting the amplitude of each cycle of each component information wave such that the ratio of the amplitude of each cycle of each component information wave to the amplitude of the reference wave is a function of the magnitude of the corresponding source digital signal.

* * * * *